(No Model.)
J. FITZGERALD & W. H. SILVER.
POTATO MASHER AND FRUIT CRUSHER.
No. 371,882. Patented Oct. 18, 1887.
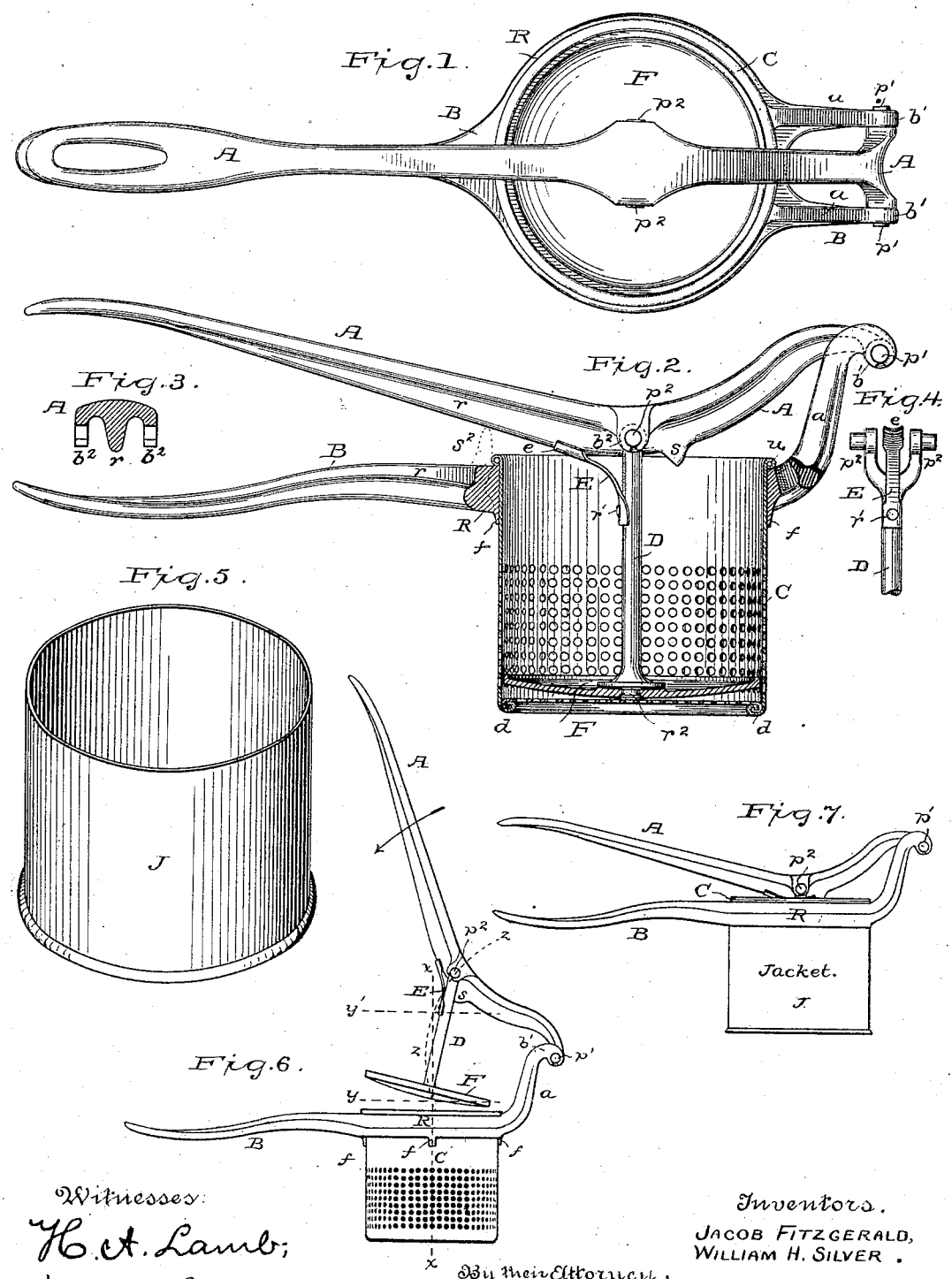
Witnesses:
H. A. Lamb
Joseph Becker
Inventors.
JACOB FITZGERALD,
WILLIAM H. SILVER.
By their Attorney,

UNITED STATES PATENT OFFICE.

JACOB FITZGERALD, OF NEWARK, NEW JERSEY, AND WILLIAM H. SILVER, OF NEW YORK, N. Y., ASSIGNORS TO SILVER & CO., OF NEW YORK, N. Y.

POTATO-MASHER AND FRUIT-CRUSHER.

SPECIFICATION forming part of Letters Patent No. 371,882, dated October 18, 1887.

Application filed June 29, 1887. Serial No. 242,853. (No model.)

*To all whom it may concern:*

Be it known that we, JACOB FITZGERALD and WILLIAM H. SILVER, citizens of the United States, and residents, respectively, of Newark, in the State of New Jersey, and of New York, in the State of New York, have invented a new and useful Improvement in Potato-Mashers and Fruit-Crushers, of which the following is a specification.

This invention relates to those potato-mashers and fruit-crushers each of which comprises a perforated cup and a lever-worked follower, the latter serving to express the mashed or crushed vegetable or fruit through the perforations of the cup, while the cup holds the vegetable or fruit preliminarily and retains the refuse, such as skins and seeds. The expressed pulp is thus discharged in "strained" condition, and in the case of potatoes and like vegetables is light, mealy, and of "appetizing" appearance.

The present invention consists in an improved article of the above description, having its follower connected with the lever-handle which works it by a single stem, and controlled by a spring and a stop, so as to enter the cup correctly, whereby we are enabled to employ a cylindrical cup without complication of parts.

Our invention consists, secondly, in providing a fixed fulcrum for said lever-handle behind the cup, with reference to the handle end of the lever-handle, and in an elevated position relatively to the top of the cup, and in pivoting said follower-stem thereto at a point which coincides with the axial center of the cup in the lowest position of the follower, whereby the follower is caused to work substantially parallel with the bottom of the cup without complication of parts.

Our invention consists, thirdly, in peculiar means for readily and securely attaching at will a removable depending jacket for use in crushing juicy fruit—such as berries—whereby the juice which squirts laterally from the cup is directed downward, so as to be readily saved.

A sheet of drawings bearing seven figures accompanies this specification as part thereof.

Figure 1 of the drawings is a top view of our potato-masher and fruit-crusher. Fig. 2 is a side view thereof, partly in vertical section. Fig. 3 represents a cross-section of the upper lever-handle. Fig. 4 is a view of the upper part of the follower-stem and its spring at right angles to the view seen in Fig. 2. Fig. 5 is a perspective view of a removable jacket which accompanies the united parts seen in Figs. 1 and 2. Fig. 6 is a small-scale side view of the article as seen in Figs. 1 and 2, illustrating its operation; and Fig. 7 is a like view of the article as provided with the said jacket.

Like letters of reference indicate corresponding parts in the several figures.

Our potato-masher and fruit-crusher comprises three main parts—namely, a pair of lever-handles, A B, and a perforated cup, C, together with a follower-stem, D, a spring, E, and a follower-disk, F, all of which may be, and preferably are, permanently united, and a removable jacket, J, (shown detached by Fig. 5,) which is used when juicy fruit is to be crushed and strained, as illustrated by Fig. 7. Said lever-handles A B and follower-stem D are malleable-iron castings, and are cast with pivots $p'$ $p^2$ and bearings $b'$ $b^2$ therefor, originally open or of fork shape, and with rivet-studs $r'$ $r^2$, so that by merely closing said bearings upon said pivots and heading said rivet-studs all the aforesaid parts, except the cup C and jacket J, are securely united without other fastenings, and the lever-handles and follower are articulated so as to work in the manner illustrated by Fig. 6. As shown in the drawings, said pivots $p'$ and bearings $b'$ are formed, respectively, on the lever-handle A and on the lever-handle B at their rear ends, as means for pivoting said lever-handle A. Said pivots $p^2$ and bearings $b^2$ are formed, respectively, on the follower-stem D at its upper end and on the lever-handle A at a corresponding point, as means for pivoting the follower to said lever-handle A, and said rivet-studs $r'$ $r^2$ are formed on said follower-stem D, as means, respectively, for attaching thereto the spring E and the follower-disk F; but said pivots and bearings may obviously be transposed without materially changing the article. After the parts of the follower are put together it may be tinned to close the crevices between its disk and stem. Said lever-handle B has a ring, R, integral therewith, into which the cup C is forced, and upon which a "wire," u, Fig. 2, at the upper edge of the cup, rests. The cup is furthermore soldered fast, so as to preclude any crevice around it, and the cup-bottom is supported by an inturned double seam, d, Fig. 2, and by solder or retinning, the latter closing the crevice around it within the cup. This manner of supporting the cup and its bottom is preferred; but, in common with other like details, it is not considered essential to the features hereinafter claimed.

To adapt the follower with its single rigid stem to enter the top of a cylindrical or substantially cylindrical cup when the lever-handle A is lowered, after filling the cup C, as illustrated by Fig. 6, said lever-handle A is provided with a "stop," $s$, which projects beneath it behind the follower-stem D—that is to say, between the latter and the pivots $p'$, upon which said lever-handle turns; and said spring E is attached to the front of the follower-stem D and abuts against the lever-handle, so as to press the follower-stem against said stop $s$, and therewith tends to keep the follower-disk F in the position relatively to said lever-handle A in which it is shown in Fig. 6. In this position the follower-disk enters the cup freely, as illustrated by Fig. 6. Said stop $s$ may be, and preferably is, cast upon a depending stiffening-rib, $r$, which forms part of the lever-handle A and against which said spring E abuts, as shown. To preclude lateral displacement of the spring, its upper end may embrace the rib to a sufficient extent, as represented at $e$; or any preferred form of spring may be employed in customary manner. The upper end of the follower-stem is bifurcated, so as to straddle said stiffening-rib, as seen in Fig. 4. The lever-handle B is correspondingly stiffened by a rib, $r$, on top thereof. To preclude lateral play of the lever-handle A and the follower, the respective pivots $p'$ $p^2$ are formed in pairs sufficiently wide apart, as represented by Figs. 1 and 4.

To enable the follower-disk F to work within the cup C substantially parallel to its bottom, the bearings $b'$ of said pivots $p'$ are elevated relatively to the top of the cup by forming them at the extremities of upwardly-projecting arms $a$ $a$, which spring to a sufficient height from said ring R, opposite the hand end of the lever-handle B, and by locating said pivots $p^2$, as represented, so that their vertical plane coincides with the axial center of the cup in the lowest position of the follower, as aforesaid. The follower is shown in this position in Figs. 1, 2, and 7. In Fig. 6 the axial center of the cup is represented by the perpendicular dotted line $x$, and the horizontal plane of said pivots $p^2$ in their said lowermost position is represented by the dotted line $y$. The parallel dotted line $y'$ represents another horizontal plane, in which the vertical plane of the pivots $p^2$ coincides with said axial center $x$, the dotted arc $z$ representing the path of said pivots. When said pivots reach said plane $y'$ in the downward movement of the follower, (illustrated by Fig. 6,) the follower-disk F becomes horizontal within the cup C, for the beginning of the pressing operation, and when said pivots reach said plane $y$ the follower-disk is again horizontal for the end of the operation. Its very slight oscillation between these points is not disadvantageous. A suitable stop may limit the depression of the follower, as represented in dotted lines at $s^2$, Fig. 2.

To provide for attaching the jacket J when it is required, as illustrated by Fig. 7, said ring R is provided with downwardly-projecting rigid fingers $f$, Figs. 2 and 6, which are embraced by the upper end of the jacket and serve to temporarily support it with ample security against accidental separation. The jacket J is sprung over the fingers $f$, and is held in place by the friction due to its resiliency and its contact with the respective fingers.

We disclaim the invention of the following, which is claimed by another party, viz: "In a disintegrator, substantially such as described, the combination of a pair of hinged levers, one of said levers carrying a removable cup, the bottom and sides of which are perforated, a follower hung to the other lever, and a deflecting-skirt, the internal diameter of which at its upper end corresponds to the external diameter of the cup and adapted to be removably set over the cup below the lever carrying the cup."

Having thus described our said improvement, we claim as our invention and desire to patent under this specification—

1. An improved potato-masher or fruit-crusher comprising a pair of lever-handles, a cylindrical or substantially cylindrical perforated cup, a swinging follower, and a spring, substantially as herein specified, the lever-handle to which said follower is pivoted having a stop, against which the follower-stem is pressed by said spring, for the purpose set forth.

2. The combination, substantially as herein specified, of a cylindrical or substantially cylindrical perforated cup, a follower-disk loosely fitted to the same and having a central stem, a lever-handle pivoted directly to the upper end of the follower-stem, and a support for said cup having rigid upwardly-projecting arms, to which said lever-handle is pivoted at a fixed point that is behind the cup with reference to the handle end of said lever-handle and elevated above the top of the cup, substantially as shown, for the purpose set forth.

3. In combination with a cylindrical or substantially cylindrical cup having perforated sides, a support for said cup comprising a ring, R, which embraces the cup and is provided with downwardly-projecting rigid fingers $f$, and a removable imperforate jacket, J, which is sprung over said fingers and depends therefrom, substantially as herein specified.

JACOB FITZGERALD.
WILLIAM H. SILVER.

Witnesses:
ABRAHAM MANNERS,
J. H. ERNST.